United States Patent Office  3,238,186
Patented Mar. 1, 1966

3,238,186
STORABLE POLYMERIZABLE SYSTEMS CONTAINING BORON COMPOUND CATALYST AND HALOGEN INHIBITOR
Donald R. Schultz, White Bear Lake, and Norman P. Sweeny, Woodbury Township, Washington County, Minn., assignors to Minnesota Mining and Manufacturing Company, St. Paul, Minn., a corporation of Delaware
No Drawing. Filed June 19, 1961, Ser. No. 117,825
18 Claims. (Cl. 260—88.7)

This application relates to the polymerization of vinyl compounds and more particularly to the production of storable polymer systems which polymerize in the presence of air, and which contain ethylenic monomers with boron alkyls as polymerization initiators.

It is well known that compounds containing ethylenic double bonds can be polymerized by the use of boron alkyl compounds. It is also known that addition of air or oxygen greatly increases the speed of polymerization of some of these monomer-organoboron systems. Since it is extremely difficult, if not impossible, to remove all of the oxygen from a system, it has not been possible heretofore to produce suitable storage initiator-monomer mixtures which could be used directly. Instead, it has been the practice to mix the components of the polymerization reaction immediately before they are to be used.

It is an object of this invention to produce a one part, storable boron-alkyl vinyl-type monomer system which polymerizes when exposed to air or oxygen. It is another object of this invention to provide inhibitors which prevent the polymerization during storage of certain especially active systems of these types, but which permit the ready and complete polymerization of the vinyl monomer upon exposure to normal atmosphere. A still further object of the invention is to provide such one part storable systems which give useful compositions when exposed to air.

In accordance with the above and other objects of the invention, it has been found that when certain inhibitors are added in an effective amount to polymerizable mixtures containing ethylenic monomers and boron alkyl initiators, the resulting mixtures are stable upon storage under ordinary conditions of temperature and pressure, so long as air is excluded, but upon exposure to the normal atmosphere, they polymerize readily to form useful polymers. A particular advantage of the compositions of the invention is that they can be employed as coatings, potting, embedding, adhesive and sealing compositions and the like, which, on exposure to air, advance in cure or "set up" and provide the polymers. For convenience, the ethylenic monomers and prepolymers which are employed for the purpose of the invention are sometimes hereinafter referred to generically as vinyl compounds or vinyl-type monomers and prepolymers.

Vinyl compounds which are suitable for use as monomers in the compositions of the invention are those which can be polymerized by conventional polymerization methods with the aid of free radical-forming initiators such as, for example, benzoyl peroxide, azo-bis-isobutyronitrile, and t-butyl hydroperoxide, and these monomers include compounds containing at least one terminal ethylenic double bond and corresponding to the formula:

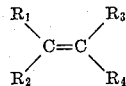

in which $R_1$, $R_2$, $R_3$ and $R_4$ represent hydrogen, halogen, saturated hydrocarbon radicals, unsaturated hydrocarbon radicals, aryl radicals, ester groups, ether groups, carboxyl groups, nitrile groups and halogen-substituted hydrocarbon radicals; and at least one of $R_1$, $R_2$, $R_3$ and $R_4$ is a polar group other than a hydrocarbon radical, except when one of the radicals is an aryl group. Mixtures of these monomers can be employed to produce copolymers, and low molecular weight prepolymers derived from such monomers and which are vinyl terminated can also be used. The vinyl compounds of the invention are exemplified by such substances as vinyl chloride, vinylidene chloride, vinyl fluoride, vinylidene fluoride, trifluoroethylene, tetrafluoroethylene, chlorotrifluoroethylene, chloroethylene, vinyl acetate, vinyl ethers, acrylic acid, esters of acrylic acid such as methyl acrylate, methyl methacrylate, butyl acrylate, allyl acrylate, 2-ethylhexyl acrylate, butyl methacrylate, hexyl methacrylate, octyl methacrylate, decyl methacrylate, lauryl methacrylate, stearyl methacrylate, tetraethyleneglycol dimethacrylate, ethyleneglycol dimethacrylate, allyl halids, acrylonitrile, styrenes, and the like. Mixtures of such monomers which produce copolymers in conventional free-radical polymerizations also produce copolymers when employed in the compositions of the invention. While monomers which are liquids at ordinary temperature and pressures are most convenient, gaseous monomers can be used, either under pressure or when dissolved in liquid monomers.

Any boron alkyl which initiates an air-accelerated free-radical type polymerization of a vinyl type monomer can be used in the composition of the invention. Such initiators are well known to the art, as shown by numerous publications, e.g., Furukawa et al., Die Makromoleculare Chemie, vol. 31, p. 122, 1959; ibid., vol. 30, p. 109, 1959; Furukawa et al., J. Polymer Science, vol. 36, p. 275, 1959; Sakata et al., Die Makromoleculare Chemie, vol. 40, p. 64, 1960; and others.

Typical of the organoboron compounds which are useful as initiators in the present invention are those which have the general formula:

wherein X represents a member selected from the group consisting of bromine atoms, chlorine atoms, $-OR_7$ radicals,

radicals and $R_8$ radicals and wherein each $R_5$, $R_6$, $R_7$ and $R_8$ represents a monovalent hydrocarbon radical. Examples of such initiators are triethylborane, tributylborane, trihexylborane, tridecylborane, tricyclohexylborane, dibutylboron chloride, dibutyl boron bromide, $(Bu)_2B$—O—$B(Bu)_2$, $(Bu)_2B$—OBu, and the like. Mixtures of boron alkyl type initiators can also be employed.

The amount of initiator to be used is in the range of about 0.1 to 10 mole percent of the quantity of the monomer to be polymerized, depending on the rate of polymerization and the degree of polymerization desired, as is known to the art. Lower amounts can be used advantageously in certain instances.

Polymerization inhibitors useful in the compositions of this invention can be characterized as halogens of atomic number greater than 16 (including compounds which are sources of such halogens). The halogens can be supplied in several ways, as, for example, the elements, in solution, or as molecular complexes containing no active hydrogen. The inhibitor should be free from adverse effects upon the boron alkyl initiator.

The polymerization inhibitors which are employed are more specifically illustrated by iodine, bromine, chlorine;

they may be supplied by means of such compounds as tetramethylammonium chlorodibromide. Iodine and bromine form a preferred group of inhibitors for the compositions of the invention.

The inhibitor is used in effective amounts, not less than about 0.002 mole percent, based on the monomer, and ranging up to the maximum amount which will permit a degree of polymerization of not less than about 20 monomer units in the polymer after exposure of the mixture to air. It may be theorized (although applicants do not intend to be bound by this theory) that the inhibitors of the invention may be considered to function as chain terminators for the polymerization after exposure to air and excessive amounts of these substances may even prevent a useful degree of polymerization. Consequently, such excessive amounts, which are not effective amounts for the purposes of the invention, should be avoided. While up to about 200 mole percent of inhibitor, based on the amount of initiator present, can be used in the case of the more volatile inhibitors, which are in part lost on exposure to the atmosphere, preferably not more than up to about 5 mole percent of inhibitor (based on monomer) are employed.

Preferred ranges of amounts of inhibitors are as follows: when iodine is used as the inhibitor, up to about one mole percent of iodine based on the monomers present, and not more than about 40 mole percent based on the initiator present. Similarly, in the case of bromine, up to three mole percent, based on the monomer, or 200 mole percent based on the initiator can be used. In the case of chlorine, up to the three mole percent based on monomer and up to 200 mole percent based on initiator can be used.

The inhibitor substantially prevents polymerization as long as the mixture is preserved in a closed container (out of contact with oxygen), but when the compositions are exposed to oxygen or air, polymerization proceeds. The exact amount to be used for any specific purpose can readily be determined empirically, based on the above-described amounts. For example, the amount to be used is determined readily by preparing samples containing varying amounts of inhibitors and initiators while excluding oxygen, observing the behavior of the samples during storage and after exposure to air.

The polymerization mixtures may consist of only the inhibitor, initiator and monomer or mixture of monomers to be polymerized, since these are liquids at ordinary temperatures and pressures in many cases. However, if desired, organic solvents inert toward the initiator can be employed as diluents. For the purpose of producing sealants, adhesives, coatings, or other formulations for specific purposes, suitable compatible fillers, pigments, dyes, plasticizers, and the like, may also be added to the compositions. Especially useful compositions of the invention are those in which an inert propellant gas, such as one of the low molecular weight chlorofluorocarbons available under the trademark "Freon," is added to the compositions.

For the preparation of the compositions of the invention the monomer or mixture of comonomers or prepolymers selected, generally in more or less purified state, for example, as available commercially, is mixed with the inhibitor and any desired compatible solid or liquid adjuvant materials, such as pigments, dyes, plasticizers, or the like. The mixing of the solution is carried out under such conditions as to prevent the access of air to the mixture, as by entrainment or solution or otherwise. To this mixture is added the organoboron initiator, either as such or dissolved in a small amount of inert solvent. The initiator can be added simultaneously with the inhibitor or immediately prior thereto, although it will be apparent that when extremely active initiators such as triethyl borane are used and the monomer contains dissolved oxygen the inhibitor should be added first. The addition of the inhibitor is likewise made under conditions of exclusion of air, e.g., using a blanket of inert gas, such as nitrogen, or the like. The resulting composition can then be placed in containers and stored for extended periods at room temperature. When suspended adjuvants are employed, agitation means is desirably included so that stirring may be accomplished without exposure to air. The composition can be stored for substantially indefinite periods under refrigeration. Polymerization takes place only upon exposure of the mixture to the atmosphere.

Having thus generally described the invention, the following examples will more specifically illustrate the novel products and compositions. In these examples the inherent viscosity $<\eta>$ is determined by conventional procedures at 25° C. using a concentration of about 0.1 to 0.2 g. of polymer per deciliter of a solvent which unless otherwise indicated is methyl ethyl ketone.

The following procedure illustrates one method for the preparation and use of the compositions of the invention.

EXAMPLE 1

A previously degassed ampoule of suitable size containing the selected inhibitor is attached to a high-vacuum system and cooled to $-78°$ C. with solid carbon dioxide and evacuated at $10^{-5}$ mm. Hg pressure. The desired amount of triethylborane or other initiator and the desired amount of monomer are distilled at a minimum temperature into the ampoule at $10^{-5}$ mm. Hg while continuing cooling. The ampoule is then sealed off from the system. When samples are prepared for empirical determination of the amount of inhibitor to be used, the extent of polymerization is followed either by determining increase in viscosity or by isolation of the polymer. For example, the change in viscosity of the contents of the ampoules may be observed over a period of time by noting the rise of a bubble through the mixture. Any decrease in the rate of rise of the bubble when the ampoule is inverted indicates increasing viscosity caused by polymerization. Additionally, any polymer formed under these anaerobic conditions can be isolated and measured by opening an ampoule in a nitrogen atmosphere and precipitating the contents in a suitable non-solvent for the polymer such as methanol. The precipitated polymer is collected, dried and weighed. Inherent viscosities, $<\eta>$, are determined by conventional methods in methylethylketone or other suitable solvents. (See P. J. Flory, "The Principles of Polymer Chemistry," Cornell University Press, New York, 1953.)

Air is admitted to the contents of the ampoules when one wishes to effect aerobic polymerization, the extent of which likewise is followed by viscosity measurements or isolation of the polymer.

A series of runs is made employing about 80 to 100 millimoles of methyl methacrylate, using about 1½ mole percent of triethylborane as the initiator, and in which various substances are employed as inhibitors. The storability is followed by the rate of rise of the bubble as described above. Mixtures becoming thicker on standing obviously have a short shelf-life.

A control sample containing no added inhibitor increased in viscosity from about the third day. Other control samples showed 17 and 32 percent conversion in 48 and 100 hours, respectively, under anaerobic conditions. Samples containing the conventional inhibitors para-tertiary butylcatechol, hydroquinone, and diphenyl picryl hydrazyl, which might be expected to inhibit polymerization, all showed polymerization by the end of one day indicating that these inhibitors actually tended to accelerate the reaction.

Samples of compositions of the invention containing about 0.005 mole percent of iodine, 1.8 mole percent of bromine, 2.2 mole percent of chlorine, and 0.06 mole percent of tetramethylammonium chloride dibromide, respectively, showed no significant increase in viscosity for a week. The samples containing iodine and bromine retained their original viscosity for two weeks and longer.

Other samples of compositions of the invention are prepared and after storage with no evident polymerization for from 2 to 5 days are exposed to air to bring about polymerization and are then worked up for polymer. These results are summarized in Table I where concentrations of triethylborane, $(C_2H_5)_3B$, and of inhibitor are expessed in mole percent of the monomer methyl methacrylate. Somewhat enhanced yields result from more prolonged reaction after exposure to air or oxygen.

Table I

| Run | Inhibitor | $(C_2H_5)_3B$, mole percent | Inhibitor, mole percent | Storage time, hours | Aerobic polymerization | |
|---|---|---|---|---|---|---|
| | | | | | Yield, percent | $<\eta>$ |
| 1 | $I_2$ | 1.44 | 0.32 | 48 | 64 | 0.77 |
| 2 | $I_2$ | 1.36 | 0.004 | 67 | 64 | 0.42 |
| 3 | $Br_2$ | 1.48 | 2.95 | 100 | 61 | 0.73 |
| 4 | $Cl_2$ | 1.38 | 2.20 | 125 | 44 | 1.05 |

EXAMPLE 2

The procedure of Example 1 is followed, employing iodine as an inhibitor and triethylborane as initiator. Various ethylenic monomers are employed, and controls are provided in which no inhibitor is used. Typical results are shown in Table II.

EXAMPLE 3

Iodine (0.037 millimole) is transferred into a glass reaction vessel equipped with a stopcock cap in a nitrogen-filled dry box containing zero percent oxygen as determined by a Mine Safety Appliance Model DF77600 oxygen meter. The reaction vessel is closed, removed from the dry box, attached to a vacuum line, cooled to $-78°$ C. and evacuated to $10^{-5}$ mm. Hg. Methyl methacrylate (187 millimoles) and 0.2 ml. of triethylborane (1.38 millimoles) are successively vacuum distilled into the reaction vessel which is maintained at $-78°$ C. The stopcock cap is then closed and the reaction mixture is allowed to warm to room temperature to give a very fluid brown solution. No increase in viscosity or change in color is noted within 24 hours. Subsequently, upon exposure of the mixture to air, the iodine color disappears rapidly and polymethylmethacrylate is formed. This can be recovered by dissolving the polymer in methylethylketone and precipitating the solution with methanol.

EXAMPLE 4

Crown cap bottles (about 250 ml. capacity) are heated and evacuated in a vacuum oven for sixteen hours and the oven is filled with pure dry nitrogen. The bottles are then transferred to a nitrogen-filled dry box as described in Example 3 and the desired amounts of inhibitor, monomer and initiator are measured into the bottle. The bottles are capped using neoprene gaskets and special crown caps having three holes through which samples may be removed by means of hypodermic syringes inserted through the gasket. The procedure described above is modified, for convenience in comparing numerous compositions, to the technique described, for example, by Sorenson et al., "Preparative Methods of Polymer Chemistry," Interscience Publishers, New York, 1961, p. 156. The course of anaerobic reaction, if any, and aerobic reaction can thus be followed on comparable samples which are quenched at the appropriate point in methylethylketone or other suitable solvent. The polymer is precipitated in anhydrous methanol or other non-solvent for the polymer, dried and analyzed as desired. In this procedure polyvinylacetate, polystyrene and polymethyl methacrylate are dissolved in methylethylketone and polyacrylonitrile is dissolved in dimethylformamide. Polyvinylacetate is precipitated in hexane or heptane. Polystyrene, polyacrylonitrile, and polymethyl methacrylate are precipitated from methanol or methanol-water. The precipitated polymers are then filtered, dried and weighed.

Table III shows the results obtained when several different organoboron initiators are employed with methyl methacrylate and other monomers in compositions of the Table II

| Run | Monomer | Mole percent of $Et_3B$ based on monomer | Mole percent of $I_2$ based on monomer | Hours | Anaerobic polymerization | | Aerobic polymerization | |
|---|---|---|---|---|---|---|---|---|
| | | | | | Yield, percent | $<\eta>$ | Yield, percent | $<\eta>$ |
| 1 | MMA | a 1.36 | 0.004 | 67 | (d) | | 64 | e 0.424 |
| 2 | MMA | a 14.1 | 0.04 | 339 | (d) | | 57 | e 0.422 |
| 3 | MMA | a 1.33 | 0.09 | 678 | (d) | | 7 | e 0.283 |
| 4 | AN | b 0.92 | None | 48 | 21 | f 0.82 | | |
| 5 | AN | b 0.92 | 0.01 | 48 | (d) | | 56 | f 0.276 |
| 6 | ST | c 1.59 | None | 48 | 7 | e 0.675 | | |
| 7 | ST | c 1.59 | 0.01 | 150 | (d) | | 21 | e 0.216 | a Methyl methacrylate: Controls described in Example 1.
b Acrylonitrile.
c Styrene.
d No detectable change in viscosity.
e Inherent viscosity in methyl ethyl ketone.
f Inherent viscosity in dimethyl formamide.

invention as well as comparative results in which no inhibitor is present. As indicated, certain runs are made in solution in about 75 ml. of pure dry benzene. In each case there is no significant polymerization (less than about 3 percent) during the time specified when the inhibitor is present, while polymerization occurs on subsequent exposure to air, i.e., oxygen. Control runs without inhibitor are run anaerobically. Variations in yields in this and other examples are often the result of the time during which the mixture remains in contact with air before precipitation of the polymer as well as intimacy of contact achieved. Quantities of initiator and inhibitor are in mole percent based on monomer. The inhibitor is iodine except where noted. Yields of polymer, where given, are in percent of theoretical. The time in hours referred to in column 5 represents the period during which the control samples are observed. At that time (except where otherwise noted), stored inhibited samples are exposed to air for approximately 16 hours and the polymerization is then observed.

Table III

| Run | Monomer | Initiator | Concentration initiator | Time, hours | Anaerobic control yield | Concentration inhibitor | Aerobic inhibited yield |
|---|---|---|---|---|---|---|---|
| 1 | VA | Et$_3$B | 1.60 | 150 | (a) | 0.012 | (b) |
| 2 | VA | Bu$_3$B | 1.42 | 120 | (b) | 0.012 | (b) |
| 3 | AN | Hx$_3$B | 1.03 | 99 | 18 | 0.008 | (b) |
| 4 | MA | Bu$_3$B | 1.65 | 78 | 47 | 0.013 | (b) |
| 5 | MA | Hx$_3$B | 1.11 | 6 | 8 | 0.013 | d 84 |
| 6 | MA | Oc$_3$B | 1.07 | 6 | 5 | 0.013 | d 79 |
| 7 | MA | De$_3$B | 0.90 | 6 | 9 | 0.013 | d 82 |
| 8 | MA | Bu$_2$BBr | 0.53 | 55 | 11 | 0.021 | 37 |
| 9 | MA | Bu$_2$B—O—BBu$_2$ | 1.07 | 24 | 3 | 0.021 | 64 |
| 10 | MA | Cy$_3$B | 0.35 | 56 | (b) | 0.013 | (b) |
| 11 | MA | Bz$_3$B | 0.36 | 56 | (b) | 0.013 | (b) |
| 12 | MA | Et$_3$B | 1.10 | 1,920 | (b) | 0.010 | 83 |
| 13 | MA | Et$_3$B | 1.84 | 6 | (a) | 0.051 | 46 |
| 14 | MA | Et$_3$B c | 1.84 | 6 | (a) | 0.180 | 32 |
| 15 | MA | Bu$_3$B c | 1.32 | 260 | (b) | 0.022 | 25 |
| 16 | MA | Bu$_3$B c e | 1.32 | 260 | (b) | 0.037 | 25 |
| 17 | MA | Oc$_3$B c | 1.07 | 260 | (b) | 0.022 | 16 |
| 18 | MA | De$_3$B c e | 1.16 | 260 | (b) | 0.013 | 28 | a Polymerized to viscous liquid.
b Polymerized to solid mass.
c Polymerization mixture diluted with about 4 volumes of benzene.
d Stored 103 hours before exposure to air.
e Using bromine as inhibitor.

AN=Acrylonitrile. MA=Methyl methacrylate. VA=Vinyl acetate. Et=Ethyl. Bu=n-butyl. Hx=Hexyl. Oc=Octyl. De=Decyl. Cy=Cyclohexyl. Bz=Benzyl.

EXAMPLE 5

Iodine (0.02 millimole) is transferred into a reaction vessel in a nitrogen-filled dry box as described in Example 3 and vinylacetate (10 grams) and triethylborane (0.2 gram) are successively vacuum distilled into the reaction vessel which is maintained at −78° C. After the reactants are combined, the vessel is stoppered and the reaction mixture is allowed to warm to room temperature to give a very fluid brown solution. No increase in viscosity or change in color is noted within 6 months. After six months the mixture is exposed to air, the iodine color disappears and a portion of the mixture is applied to wooden pieces which are pressed together. After a few hours it is found that the pieces are firmly bonded.

EXAMPLE 6

An adhesive mixture is prepared as above by placing iodine (0.05 millimole) and "Asbestine" (a commercially available natural fibrous magnesium silicate) (5.0 grams) in a glass vessel equipped with a stopcock cap in a nitrogen-filled dry box and then adding methyl methacrylate (10 ml.) and triethylborane (0.5 ml.) as above. After the reactants are combined, the stopcock is closed, and the reaction mixture is allowed to warm to room temperature and is then transferred into a collapsible lead tube in the nitrogen-filled dry box and the end of the collapsible tube is crimped shut in the conventional manner. Portions of the fluid mass are applied at intervals over a five-day period to adhesively bond pairs of aluminum panels to each other. The tube is recapped after each application with a conventional screw cap. The strength of this adhesive in shear by tension loading is determined to be from 1100 to 1500 lb./in.$^2$ using ASTM method D1002–53T. The mixture remains usable for several weeks.

EXAMPLE 7

Iodine (0.02 millimole), fusel oil acrylate (25 ml.) and tri-n-butyl borane (0.8 ml.) are combined by the above procedures and stored for 24 hours in the laboratory. No change in viscosity or color is noted. This mixture is subsequently coated onto aluminum foil, polyethylene film, paper, and pieces of wood in the laboratory atmosphere. In each case, within a few minutes, the color disappears and a tacky, pressure-sensitive adhesive forms on the surface of the articles as a result of polymerization.

EXAMPLE 8

Iodine (0.02 millimole), methyl methacrylate (10 ml.) and tri-n-butyl borane (0.5 ml.) are combined by the above method to form a potting composition. No change in viscosity or color is noted during 24 hours storage. This mixture is poured over a coil of wire in a container with exposure to air. After a few minutes the color disappears, polymerization proceeds and the coil of wire is effectively "potted."

EXAMPLE 9

Iodine (14.4 mgm.) is transferred into a reaction vessel as above. A viscous liquid prepolymer composed of a mixture of styrene and unsaturated polyesters, obtainable under the trademark "Polylite 8130," in amount of 19.6 grams and 0.4 ml. of triethylborane are added to the vessel. No change in viscosity or color is noted during 7 days storage at ambient temperatures. Upon exposure of the mixture to the air, the iodine color disappears and a hard resinous material is obtained. Compositions of this example, mixed with a powdered metal such as aluminum, are particularly useful as "body solders," i.e., for filling dents in sheet metal.

EXAMPLE 10

Iodine (13.4 milligrams) is transferred into a reaction tube as above followed by 20 grams of a tetraethyleneglycol dimethacrylate available under the trademark "Sartomer SR–209" and triethylborane (0.4 ml.). The reaction tube containing the mixture is closed and stored for 2 days in the laboratory. No change in viscosity or color is noted. Upon exposure of the mixture to air the iodine color disappears and a polymeric material is obtained.

EXAMPLE 11

Iodine (10 milligrams), methyl methacrylate (25 ml.) and triethylborane (0.5 ml.) are charged into a pressure bottle in a nitrogen-filled dry box and the bottle is closed with a conventional aerosol spray cap. Dichlorodifluoromethane is then charged into the bottle with a commercial aerosol propellant filling apparatus. The resulting solution is a brown clear fluid. This solution, when sprayed onto a metal panel in the atmosphere, gives an adherent dry film of polymethyl methacrylate suitable as a glossy finish.

This composition is unchanged for periods up to one year on storage under ordinary conditions, at room temperature. The solution remains liquid and sprayable to produce a useful finish coating.

What is claimed is:

1. A latently polymerizable composition, substantially free from oxygen, adapted for storage in its original state under conditions in which oxygen is excluded, and for curing to a polymeric state when exposed to aerobic conditions, consisting essentially of a vinyl group-containing monomer represented by the formula:

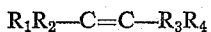

wherein $R_1$, $R_2$, $R_3$ and $R_4$ are members of the group consisting of hydrogen, halogen, saturated hydrocarbon radicals, unsaturated hydrocarbon radicals, aryl radicals, ester groups, ether groups, carboxyl groups, nitrile groups and halogen-substituted hydrocarbon radicals, at least one of the said $R_1$, $R_2$, $R_3$ and $R_4$ groups being a polar group except when one of said R groups is an aryl group; containing in admixture therewith in amount of about 0.1 to 10 mole percent, based on the monomer of a boron-alkyl initiator for free-radical type polymerization of the monomer of the formula:

wherein X represents a member selected from the group consisting of bromine atoms, chlorine atoms, —$OR_7$ radicals,

radicals and $R_8$ radicals and wherein each $R_5$, $R_6$, $R_7$ and $R_8$ represents a monovalent hydrocarbon radical, and an effective amount not less than about 0.002 mole percent, based on the amount of monomer present, but not more than about 200 mole percent based on the amount of initiator, of a polymerization inhibitor selected from the group consisting of chlorine, bromine and iodine.

2. A latently polymerizable composition, substantially free from oxygen, adapted for storage in its original state under conditions in which oxygen is excluded, and for curing to a polymeric state when exposed to aerobic conditions, consisting essentially of a vinyl group-containing monomer represented by the formula:

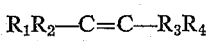

wherein $R_1$, $R_2$, $R_3$ and $R_4$ are members of the group consisting of hydrogen, halogen, saturated hydrocarbon radicals, unsaturated hydrocarbon radicals, aryl radicals, ester groups, ether groups, carboxyl groups, nitrile groups and halogen substituted hydrocarbon radicals, at least one of the said $R_1$, $R_2$, $R_3$ and $R_4$ groups being a polar group except when one of said R groups is an aryl group; containing in admixture therewith in amount of about 0.1 to 10 mole percent based in the monomer, a boron-alkyl initiator for free-radical type polymerization of the monomer of the formula:

wherein X represents a member selected from the group consisting of bromine atoms, chlorine atoms, —$OR_7$ radicals,

radicals and $R_8$ radicals and wherein each $R_5$, $R_6$, $R_7$ and $R_8$ represents a monovalent hydrocarbon radical, and an effective amount ranging from about 0.002 to about one mole percent, based on the amount of monomer present, but not more than about 40 mole percent, based on the amount of initiator, of iodine.

3. A latently polymerizable composition, substantially free from oxygen, adapted for storage in its initial state under conditions in which oxygen is excluded, and for curing to a polymeric state when exposed to aerobic conditions, consisting essentially of an acrylate monomer containing in admixture therewith in amount of about 0.1 to 10 mole percent, based on the monomer, of a boron-alkyl initiator for the polymerization of the formula:

wherein X represents a member selected from the group consisting of bromine atoms, chlorine atoms, —$OR_7$ radicals,

radicals and $R_8$ radicals and wherein each $R_5$, $R_6$, $R_7$ and $R_8$ represents a monovalent hydrocarbon radical, and an effective amount not less than about 0.002 mole percent, based on the amount of monomer present, but not more than about 200 mole percent, based on the amount of initiator, of a polymerization inhibitor selected from the group consisting of chlorine, bromine and iodine.

4. A latently polymerizable composition, substantially free from oxygen, adapted for storage as a liquid under conditions in which oxygen is excluded, and for curing to a polymeric state when exposed to aerobic conditions, consisting essentially of an acrylate monomer containing in admixture therewith in amount of about 0.1 to 10 mole percent, based on the monomer, of a boron-alkyl initiator for the polymerization of the formula:

wherein X represents a member selected from the group consisting of bromine atoms, chlorine atoms, —$OR_7$ radicals

radicals and $R_8$ radicals and wherein each $R_5$, $R_6$, $R_7$ and $R_8$ represents a monovalent hydrocarbon radical, and an effective amount ranging from about 0.002 to about one mole percent, based on the amount of monomer present, but not more than about 40 mole percent, based on the amount of initiator, of iodine.

5. A latently polymerizable composition, substantially free from oxygen, adapted for storage in its original state under conditions in which oxygen is excluded, and for curing to a polymeric state when exposed to aerobic conditions consisting essentially of methyl methcrylate containing in admixture therewith in amount of about 0.1 to 10 mole percent, based on the monomer of a boron-alkyl initiator for free-radical type polymerization of the monomer of the formula:

wherein X represents a member selected from the group consisting of bromine atoms, chlorine atoms, —$OR_7$ radicals

radicals and $R_8$ radicals and wherein each $R_5$, $R_6$, $R_7$ and $R_8$ represents a monovalent hydrocarbon radical, and an effective amount not less than about 0.002 mole percent, based on the amount of monomer present, but not more than about 200 mole percent, based on the amount of initiator, of a polymerization inhibitor selected from the group consisting of chlorine, bromine and iodine.

6. A latently polymerizable composition, substantially free from oxygen, adapted for storage in its original state under conditions in which oxygen is excluded, and for curing to a polymeric state when exposed to aerobic conditions, consisting essentially of acrylonitrile containing in admixture therewith in amount of about 0.1 to 10 mole percent, based on the monomer of a boron-alkyl initiator for free-radical type polymerization of the monomer of the formula:

wherein X represents a member selected from the group consisting of bromine atoms, chlorine atoms, —$OR_7$ radicals

radicals and $R_8$ radicals and wherein each $R_5$, $R_6$, $R_7$ and $R_8$ represents a monovalent hydrocarbon radical, and an effective amount not less than about 0.002 mole percent, based on the amount of monomer present, but not more than about 200 mole percent based on the amount of initiator, of a polymerization inhibitor selected from the group consisting of chlorine, bromine and iodine.

7. A latently polymerizable composition, substantially free from oxygen, adapted for storage in its original state under conditions in which oxygen is excluded, and for curing to a polymeric state when exposed to aerobic conditions, consisting essentially of vinyl acetate containing in admixture therewith in amount of about 0.1 to 10 mole percent, based on the monomer of a boron-alkyl initiator for free-radical type polymerization of the monomer of the formula:

wherein X represents a member selected from the group consisting of bromine atoms, chlorine atoms, —$OR_7$ radicals

radicals and $R_8$ radicals and wherein each $R_5$, $R_6$, $R_7$ and $R_8$ represents a monovalent hydrocarbon radical, and an effective amount not less than about 0.002 mole percent, based on the amount of monomer present, but not more than about 200 mole percent based on the amount of initiator, of a polymeriation inhibitor selected from the group consisting of chlorine, bromine and iodine.

8. A latently polymerizable composition, substantially free from oxygen, adapted for storage in its original state under conditions in which oxygen is excluded, and for curing to a polymeric state when exposed to aerobic conditions, consisting essentially of styrene containing in admixture therewith in amount of about 0.1 to 10 mole percent, based on the monomer of a boron-alkyl initiator for free-radical type polymerization of the monomer of the formula:

wherein X represents a member selected from the group consisting of bromine atoms, chlorine atoms, —$OR_7$ radicals

radicals and $R_8$ radicals and wherein each $R_5$, $R_6$, $R_7$ and $R_8$ represents a monovalent hydrocarbon radical, and an effective amount not less than about 0.002 mole percent, based on the amount of monomer present, but not more than about 200 mole percent based on the amount of initiator, of a polymerization inhibitor selected from the group consisting of chlorine, bromine and iodine.

9. A composition, substantially free from oxygen, consisting essentially of methyl methacrylate, containing in admixture therewith triethyl borane in amount of about 0.1 to 10 mole percent, based on the monomer; and an effective amount not less than about 0.002 mole percent, based on the mount of monomer present, but not more than about 200 mole percent, based on the amount of triethyl borane, of a polymerization inhibitor selected from the group consisting of chlorine, bromine and iodine.

10. A composition according to claim 9, in which the polymerization inhibitor is iodine.

11. A composition, substantially free from oxygen, consisting essentially of methyl methacrylate, containing in admixture therewith tributyl borane in amount of about 0.1 to 10 mole percent, based on the monomer; and an effective amount not less than about 0.002 mole percent, based on the amount of monomer present, but not more than about 200 mole percent, based on the amount of tributyl borane, of a polymerization inhibitor selected from the group consisting of chlorine, bromine and iodine.

12. A composition according to claim 11, in which the inhibitor is iodine.

13. A composition, substantially free from oxygen, consisting essentially of acrylonitrile, containing in admixture therewith triethyl borane in amount of about 0.1 to 10 mole percent, based on the monomer; and an effective amount not less than about 0.002 mole percent, based on the amount of monomer present, but not more than about 200 mole percent, based on the amount of triethyl borane, of a polymerization inhibitor selected from the group consisting of chlorine, bromine and iodine.

14. A composition according to claim 13, in which the polymeriation inhibitor is iodine.

15. A composition, substantially free from oxygen, consisting essentially of acrylonitrile containing in admixture therewith tributyl borane in amount of about 0.1 to 10 mole percent, based on the monomer; and an effective amount not less than about 0.002 mole percent, based on the amount of monomer present, but not more than about 200 mole percent, based on the amount of tributyl borane, of a polymerization inhibitor selected from the group consisting of chlorine, bromine and iodine.

16. A composition according to claim 15, in which the inhibitor is iodine.

17. A composition, substantially free from oxygen, consisting essentially of vinyl acetate containing in admixture therewith trietbyl borane in amount of about 0.1 to 10 mole percent, based on the monomer; and an effective amount not less than about 0.002 mole percent, based on the amount of monomer present, but not more than about 200 mole percent, based on the amount of triethyl borane, of a polymerization inhibitor selected from the group consisting of chlorine, bromine and iodine.

18. A composition, substantially free from oxygen, consisting essentially of styrene containing in admixture therewith triethyl borane in amount of about 0.1 to 10 mole percent, based on the monomer; and an effective amount not less than about 0.002 mole percent, based on the amount of monomer present, but not more than about 200 mole percent, based on the amount of triethyl borane, of a polymerization inhibitor selected from the group consisting of chlorine, bromine and iodine.

References Cited by the Examiner

UNITED STATES PATENTS

| | | | |
|---|---|---|---|
| 1,950,438 | 3/1934 | Carothers et al. | 260—92.3 |
| 2,255,483 | 9/1941 | D'Alelio | 260—89.5 |
| 2,764,589 | 9/1956 | Hudson et al. | 260—283 |
| 2,985,633 | 5/1961 | Welsh | 260—88.1 |

JOSEPH L. SCHOFER, *Primary Examiner.*